Figure 1:
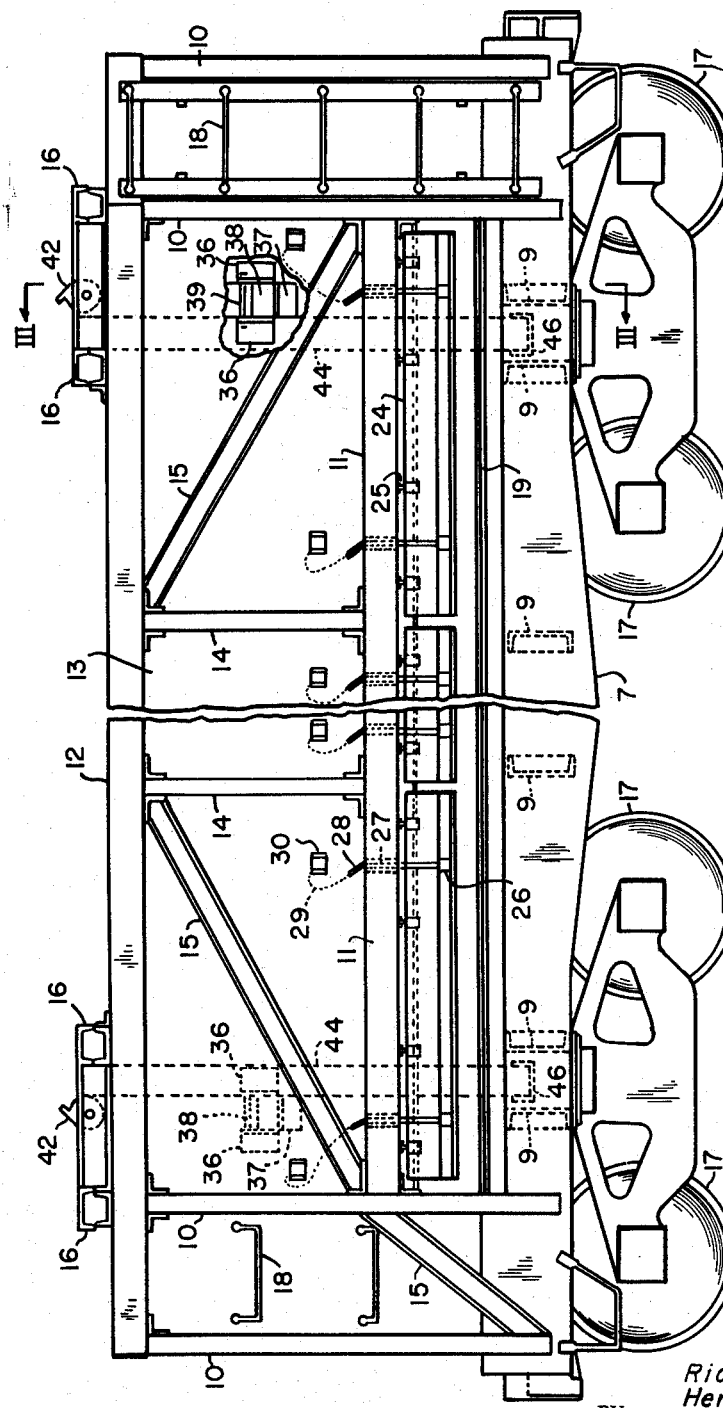

July 16, 1963  R. E. FRANKLIN ETAL  3,097,754
APPARATUS FOR HANDLING TIES AND THE LIKE
Original Filed April 17, 1957  10 Sheets-Sheet 1

INVENTORS.
Richard E. Franklin
Herbert C. Fox
BY
Webb Mackey & Burden
THEIR ATTORNEYS July 16, 1963  R. E. FRANKLIN ETAL  3,097,754
APPARATUS FOR HANDLING TIES AND THE LIKE
Original Filed April 17, 1957  10 Sheets-Sheet 2

INVENTORS.
Richard E. Franklin
Herbert C. Fox
BY Webb Mackay & Burden
THEIR ATTORNEYS INVENTORS.
Richard E. Franklin
Herbert C. Fox BY Webb, Mackey & Burden

THEIR ATTORNEYS

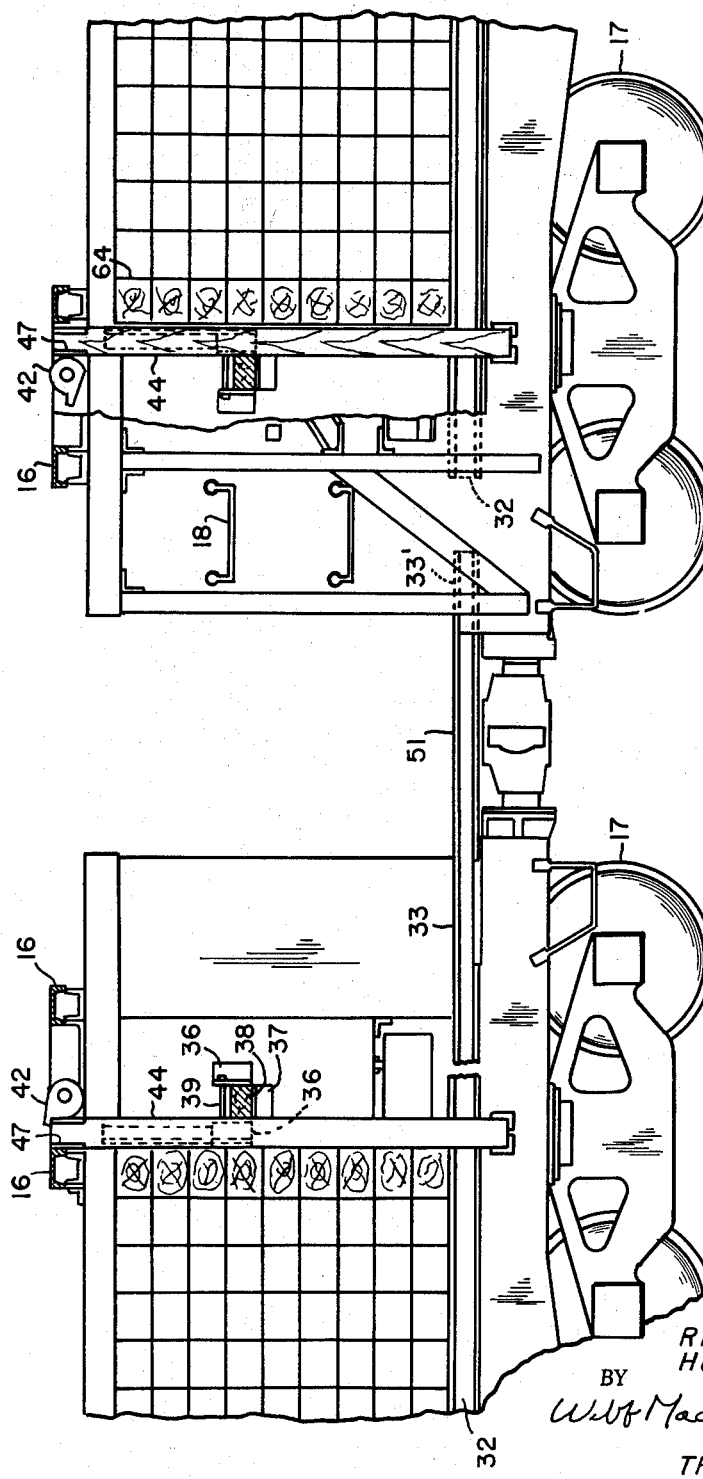

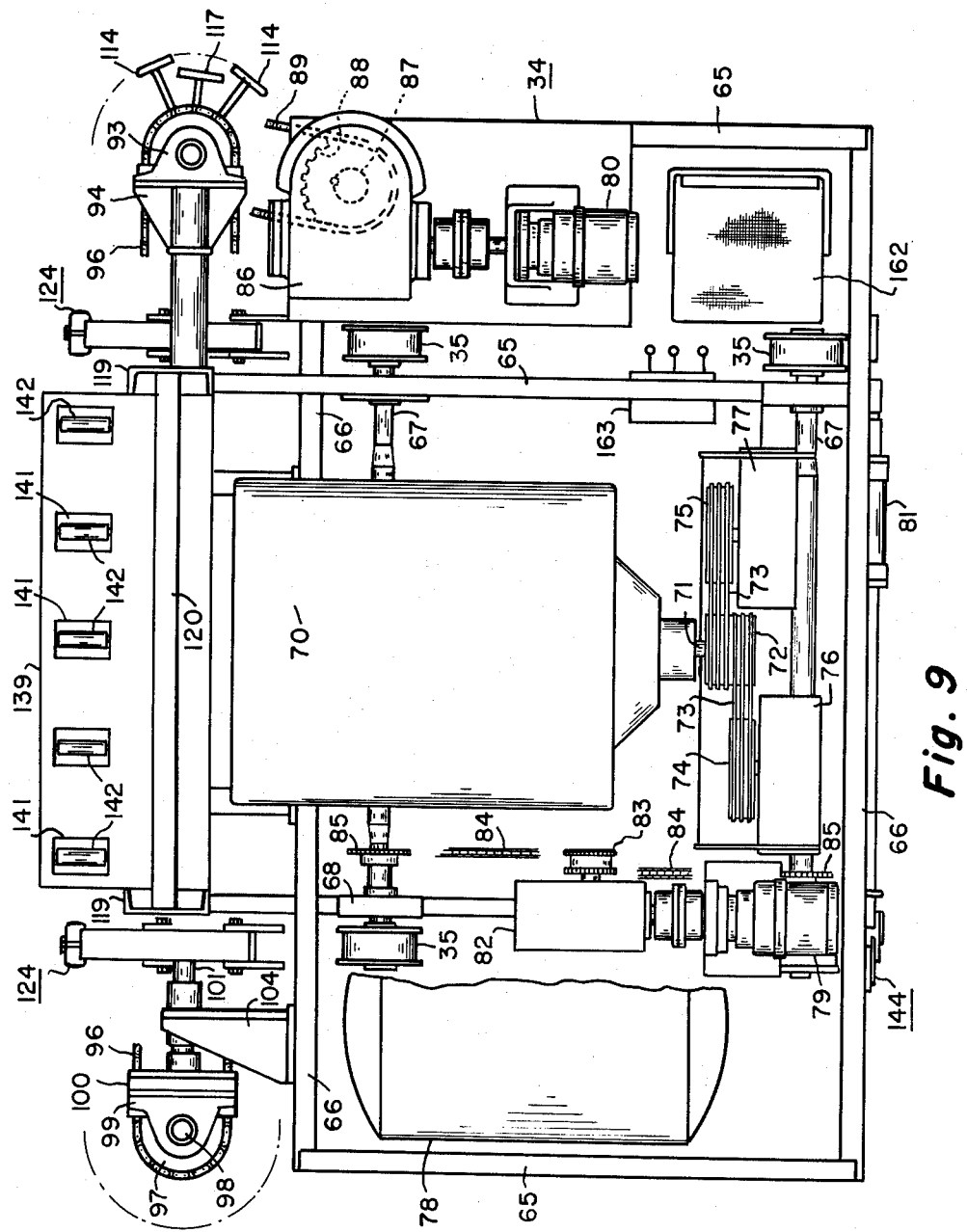

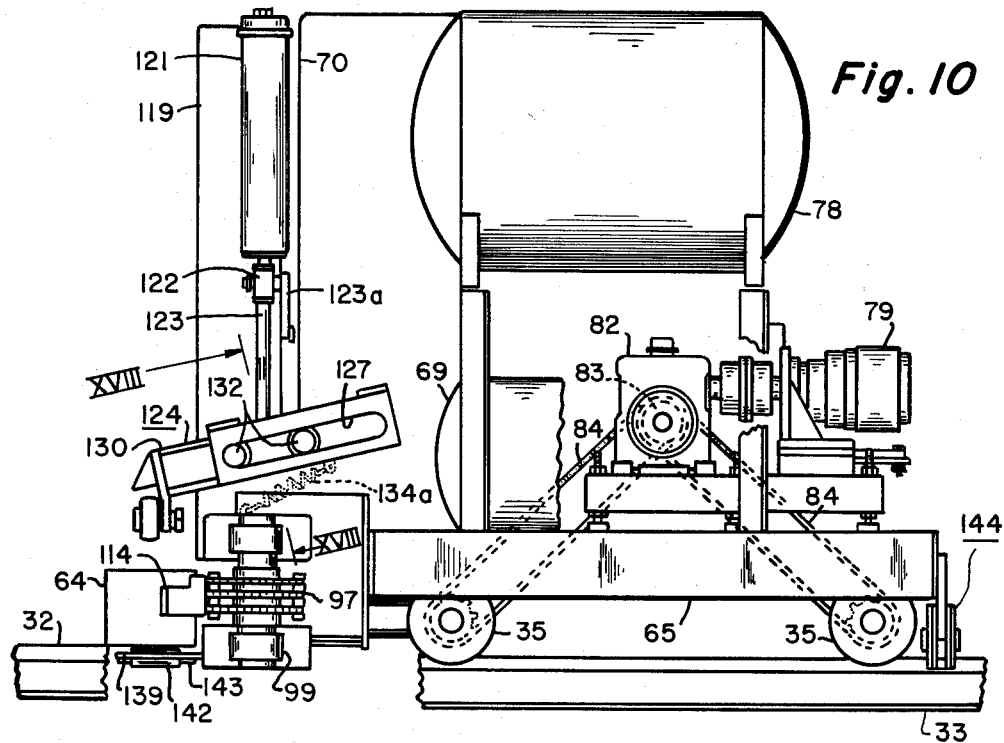

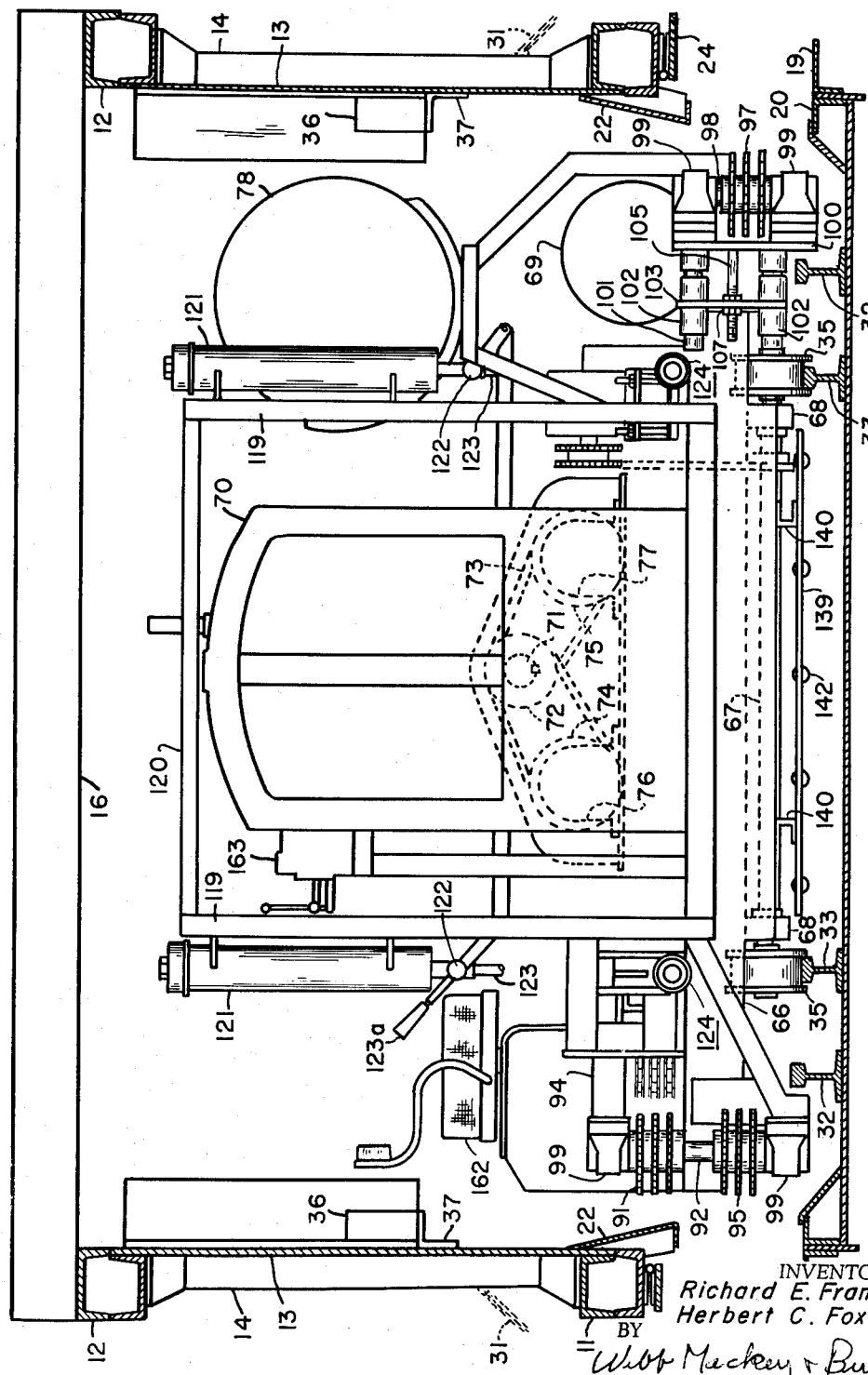

INVENTORS.
Richard E. Franklin
Herbert C. Fox
BY
THEIR ATTORNEYS

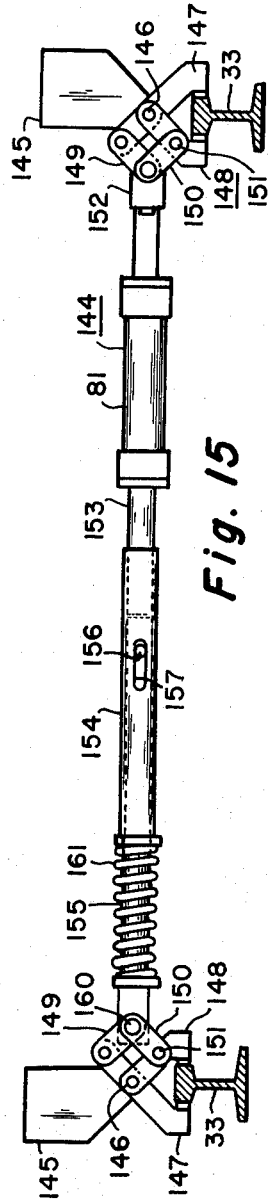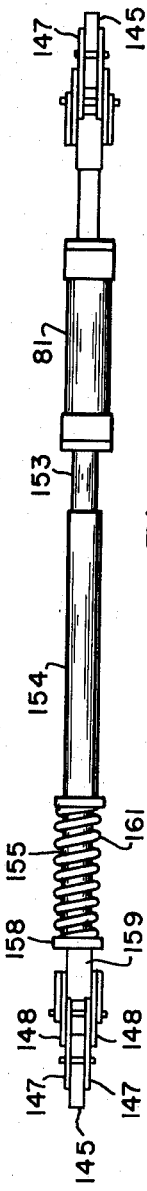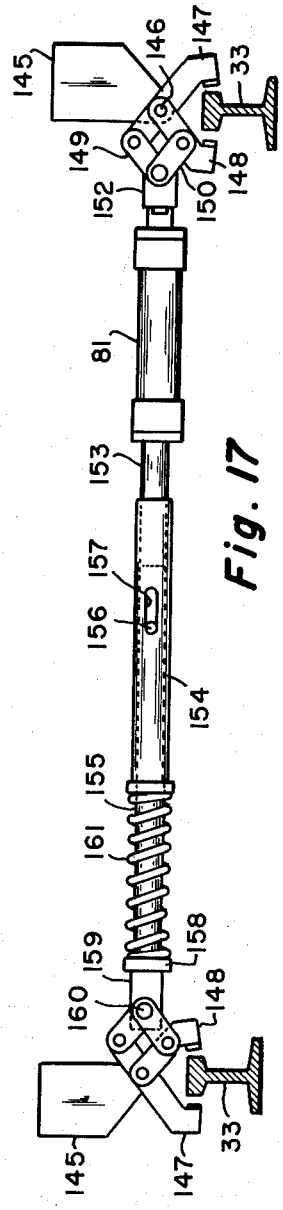

United States Patent Office 3,097,754
Patented July 16, 1963

3,097,754
APPARATUS FOR HANDLING TIES AND THE LIKE
Richard E. Franklin, Chevy Chase, Md., and Herbert C. Fox, Atlanta, Ga., assignors to Railway Maintenance Corporation, Pittsburgh, Pa., a corporation of Pennsylvania
Original application Apr. 17, 1957, Ser. No. 653,315, now Patent No. 3,048,289, dated Aug. 7, 1962. Divided and this application July 26, 1961, Ser. No. 132,518
6 Claims. (Cl. 214—82)

Our invention relates to a car for hauling railroad ties and a machine for unloading the ties from the car. The car can be loaded and unloaded rapidly and efficiently with a minimum of manpower and hand labor.

Normally, railroad ties are hauled in gondola cars and are unloaded manually by throwing the ties over the sides of the car at locations where the ties are to be used. The cost of handling the ties in this manner is great because the ties are heavy and bulky, thus requiring a great many men to unload the car. Furthermore, since the ties are haphazardly thrown over the side of the car, they do not normally land in a convenient location for subsequent use.

Our invention avoids these difficulties by providing a tie hauling car open at the top and with removable end bulkheads which permit the ties to be loaded quickly and efficiently into the car by use of a mechanical boom. To unload the car, the removable bulkheads are taken out and an unloading machine is operated inside the car to discharge the ties through openings in the side of the car.

Our invention further provides an unloading machine, for operation inside the tie hauling car, which discharges the ties individually through openings in the side wall of the tie hauling car. The unloading operation requires only one man to operate the unloading machine and one man outside the car to give signals, thus reducing labor costs. Further, the ties are deposited along the track in a convenient location for subsequent use.

This application is a division of application Ser. No. 653,315, filed April 17, 1957, now Patent No. 3,048,289.

Figure 2:
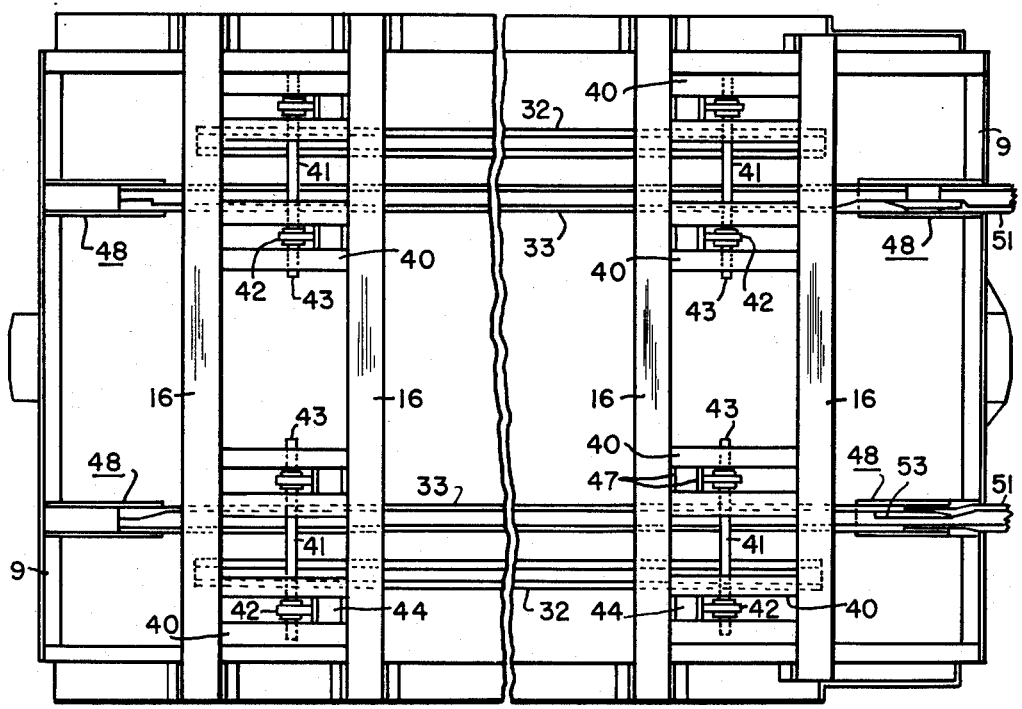
Figure 3:
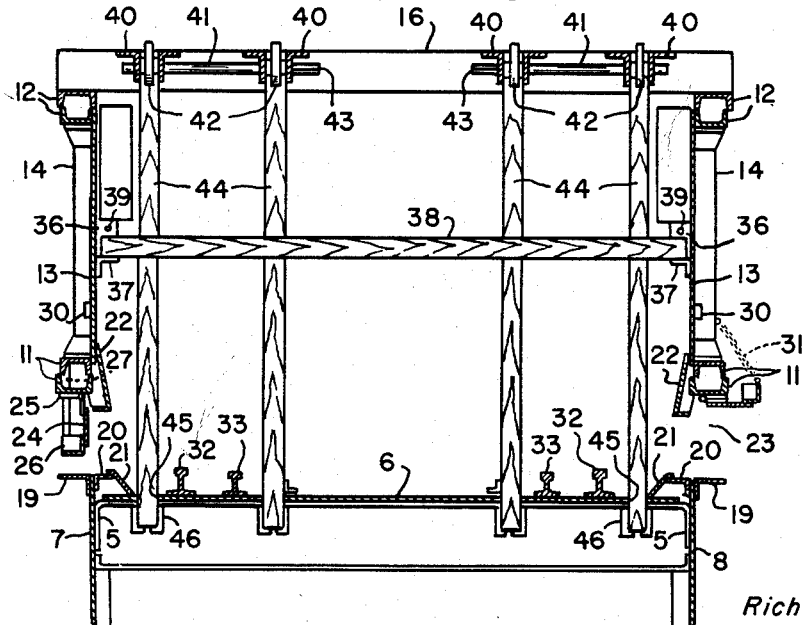
Figure 4:
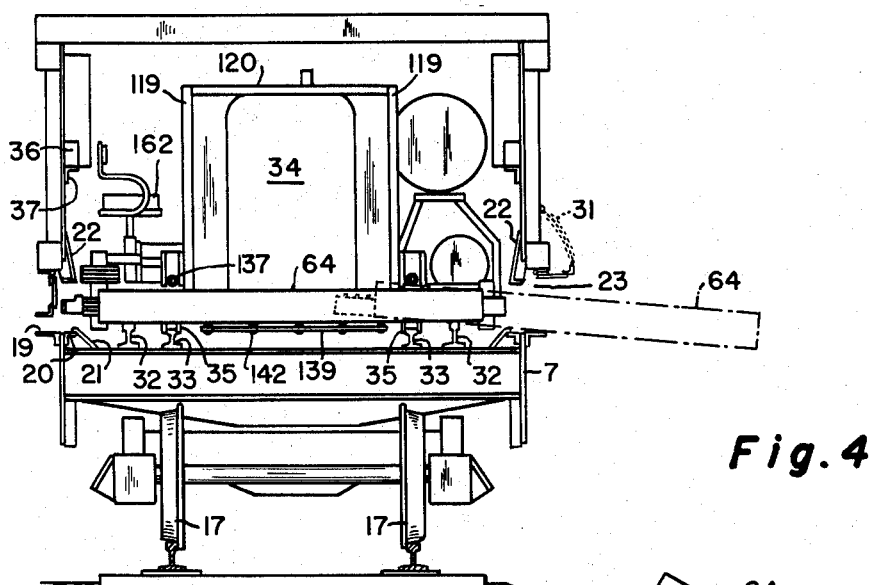
Figure 5:
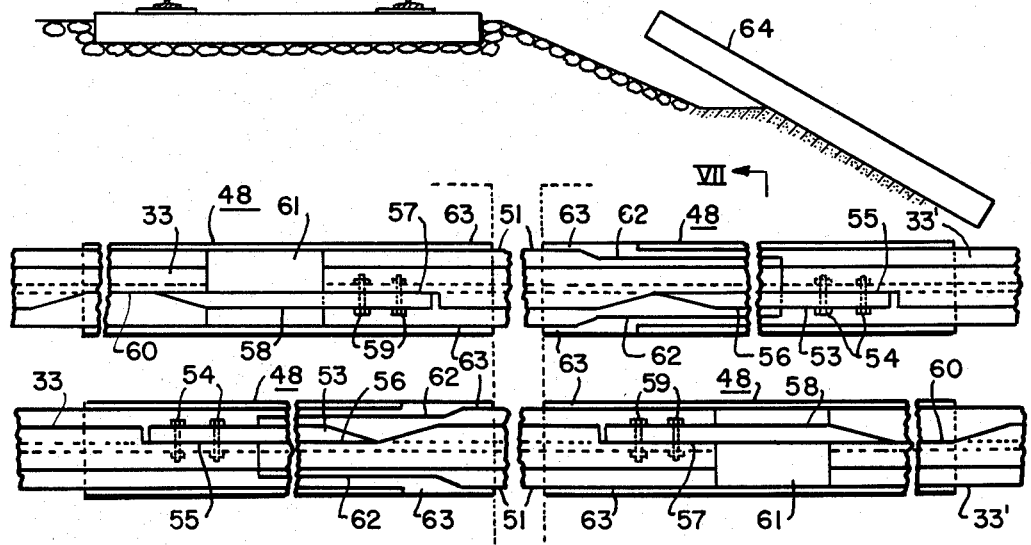
Figure 6:
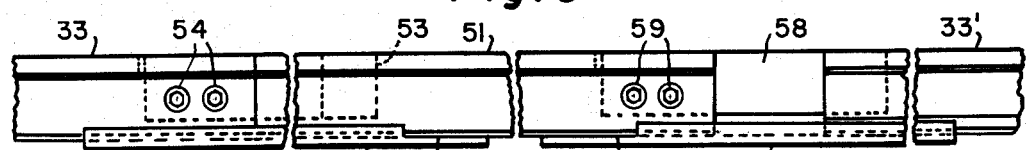
Figure 7:
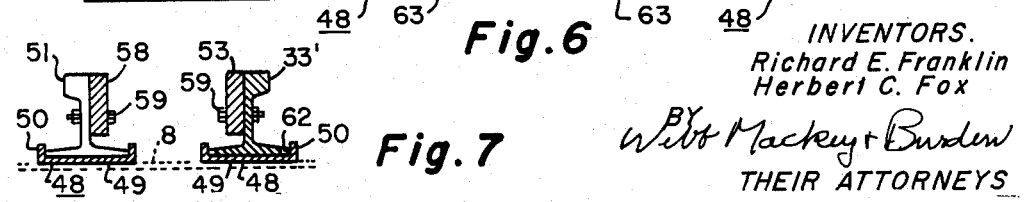
Figure 13:
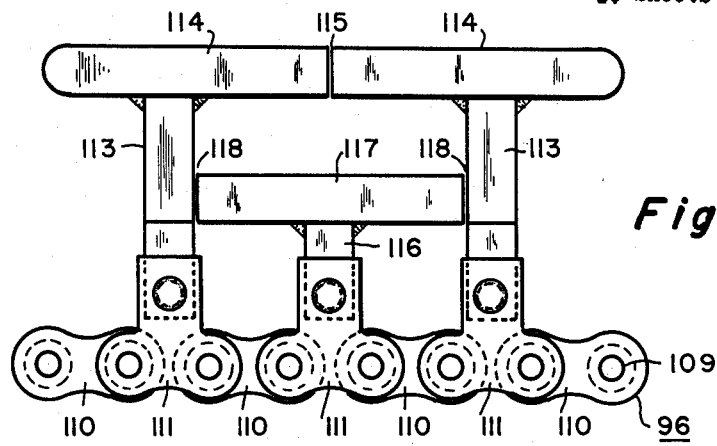
Figure 14:
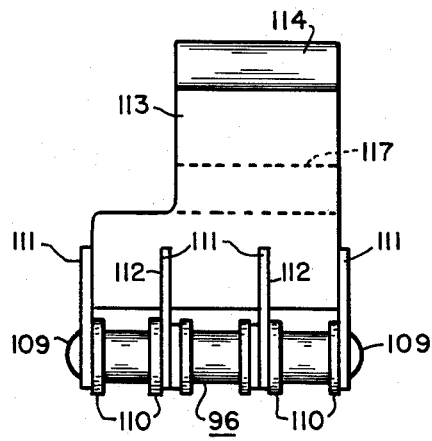
Figure 18:
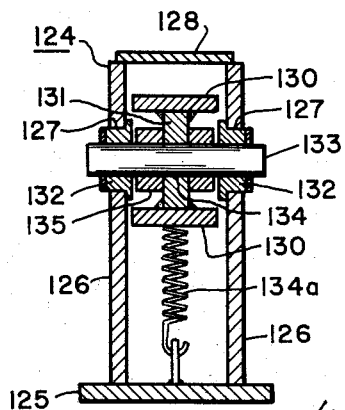
Figure 19:
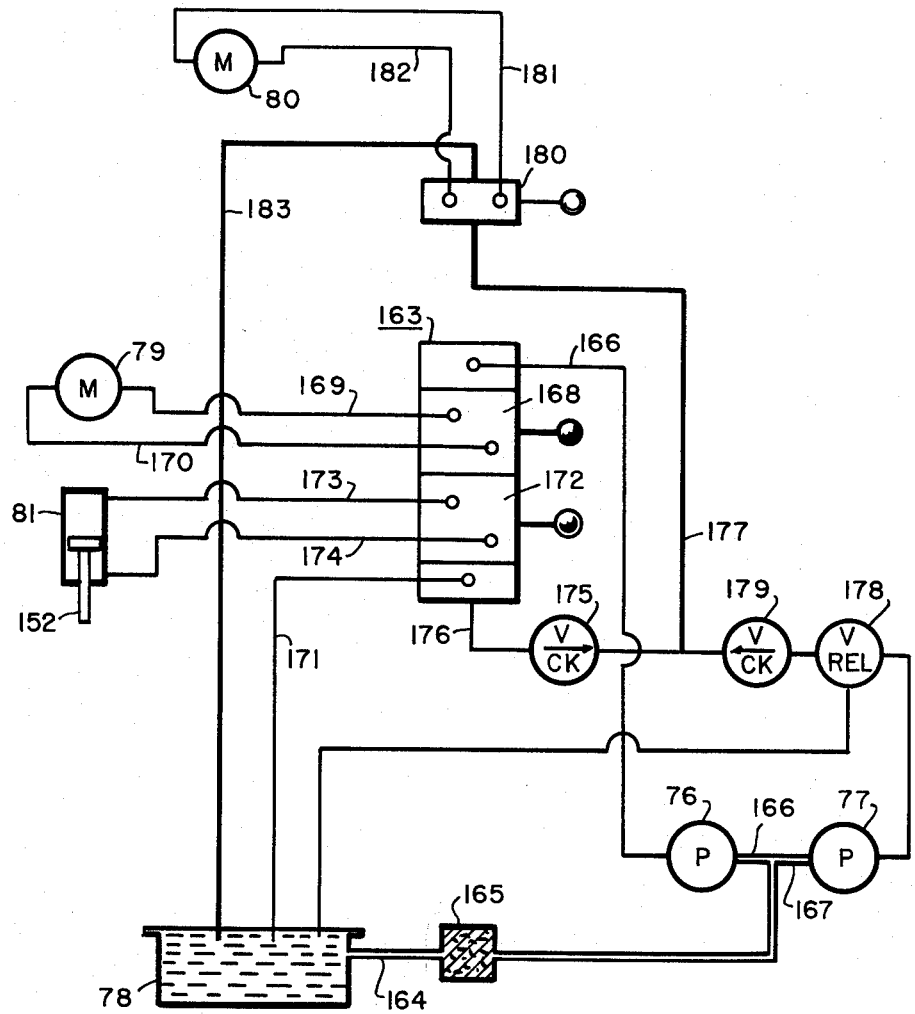

In the drawings, we have illustrated a preferred embodiment of our invention in which:

FIGURE 1 is a side elevation of the tie car;
FIGURE 2 is a plan view of the tie car;
FIGURE 3 is a cross section of the tie car taken on lines III—III of FIGURE 1;
FIGURE 4 is an end view of the car showing the unloading machine in operating position, with parts removed for clarity;
FIGURE 5 is a plan view of the movable rails for connecting two cars together;
FIGURE 6 is a side elevation of the movable rail shown in FIGURE 5;
FIGURE 7 is a cross section taken on lines VII—VII of FIGURE 5;
FIGURE 8 is a side view of two cars (with parts removed for clarity) showing the movable rail in position between the cars;
FIGURE 9 is a plan view of the tie unloading machine;
FIGURE 10 is a side view of the tie unloading machine as viewed from the left side of FIGURE 9;
FIGURE 11 is a side view of the tie unloading machine as viewed from the right side of FIGURE 9;
FIGURE 12 is a front elevation view of the tie unloading machine;
FIGURE 13 is an enlarged top view of the kicker chain;
FIGURE 14 is an enlarged side view of the kicker chain;
FIGURE 15 is a front elevation view of the rail clamp with the clamps closed;

FIGURE 16 is a plan view of the rail clamp with the clamps closed;
FIGURE 17 is a front elevation view of the rail clamp with the clamps open;
FIGURE 18 is an enlarged cross section of the tie hold taken on lines XVIII—XVIII of FIGURE 10; and
FIGURE 19 is a schematic diagram of the power system of the tie unloading machine.

Briefly, the tie car of the present invention is a special car consisting of a flat floor with two side walls extending upwardly along the longitudinal edges of the floor. The ends of the car are open except for removable bulkheads which are clamped in place to maintain a load of ties rigidly in position in the car. The side walls of the car have openings extending along their lengths at floor level to permit removal of ties from the car. The openings have hinged doors which may be locked in the closed position while the car is in transit or to permit use of the car for other purposes. Two pairs of rails extend longitudinally along the floor of the car—one pair for maintaining the load of ties at an elevation above the floor and a second pair to guide an unloading machine which operates inside the cars to remove the ties. The rails in two adjacent cars may be joined by sections of movable rail spanning the space between the cars to permit the unloading machine to move from one car to the other.

The present invention also includes a self-motivating tie unloader operable within the tie car to unload the ties therefrom. The ties in the tie car are thrust through openings in the side walls of the car by means of a continuous rotating chain having fingers which engage the ties. The chain and fingers are mounted on and operable transversely of the front end of the tie unloader.

*Tie Car*

The frame of the car consists of elongated channel members 5 extending the length of the car with a floor plate 6 rigidly affixed thereto. Side plates 7 and 8 are welded to the downwardly extending legs of channel 5 and have cross channels 9 extending between the plates to support the floor and maintain a rigid structure. The side walls consist of upwardly extending channels 10 welded at each end of the car to plates 7 and 8. Longitudinally extending channels 11 and 12 are affixed at each of their ends to channels 10. A side wall plate 13 encloses the space between the channels 10, 11, and 12 and is integral with and supported by intermediate vertical channels 14. Channels 14 are affixed at their upper and lower ends to channels 12 and 11, respectively. Suitable diagonally extending reinforcing members such as channels 15 may be placed in any desirable location along the side walls to provide proper support therefor. Channel members 16 extend transversely at each end of the car and rigidly connect the upper ends of the side walls together.

The whole car is mounted on wheels 17 in any conventional manner to permit the car to be moved along a railroad track.

A ladder 18 is provided at each end of the car to enable an operator to conveniently operate a camming mechanism described hereinafter.

The upper ends of plates 7 and 8 have angle members 19 and 20 welded thereto to provide a flat shelf and a plate 21 is welded to the angle 20 in a diagonal position to provide an incline from the floor plate 6 to the angle 20. The angles 19 and 20 assist in maintaining the ties horizontal during discharge from the car as described hereinafter.

An angularly bent plate 22 is welded to the inside of plate 13 and directed inwardly in the manner shown in FIGURE 3. Plate 22 assists in maintaining the stack of ties inside the car in proper position and alignment.

The channel members 11 are located above the angles 19 and 20 to allow an open space 23 along the whole lower edge of each side wall to permit discharge of the ties contained on the car. A door 24 is swingably mounted by hinges 25 to the lower channel member 11 such that, when the door is in the lowered position, there is not sufficient space below the door to permit a tie to shake loose from the load inside the car and slide out the opening 23.

A door pin holder 26 is welded to the lower end of the door 24 and holes 27 are cut in the channels 11 to permit door pins 28 to be inserted through the holes 27 and into the door pin holder 26, thus locking the door in a closed position. The pins 28 are connected to the car side wall by a chain 29, and when the pin is not in use it is placed out of the way by inserting it into a wall pin holder 30. Thus the side door 24 may be locked in a closed position to permit the car to be used for other purposes which require that the side walls be substantially enclosed. It is also necessary to lock the door in closed position while hauling railroad ties to avoid the possibility that one of the ties may shake loose from the load and slide out the opening. The doors are maintained in open position by chains and hooks 31.

Two pairs of tracks 32 and 33 are fixed to the floor of the car and extend in a longitudinal direction therealong. The pair of rails 32 have a greater elevation than the pair of rails 33 and are used to support the ties which have been loaded on the car in an elevated position above the floor plates 6 in the manner shown in FIGURE 4. One of the purposes of this elevated position is to permit a portion of an unloading machine 34, as shown in FIGURE 4 and described hereinafter, to move under the tie to be unloaded. A second purpose is to keep the ties from contacting rails 33 since the ties are impregnated with creosote which would cause rails 33 to become slippery resulting in difficulty in operating the unloading machine on rails 33.

The unloading machine 34 mounted on wheels 35 operates along the pair of rails 33 in removing the ties from the car, as shown in FIGURE 4.

It is within the scope of the present invention that the rails 32 and 33 be of the same height if a different type of unloading machine is used other than the one described hereinafter. It is also within the scope of this invention to use only one pair of rails in the car for use both as a track for the unloading machine and as an elevation means for the ties.

At each end of the railroad car, a pair of angle members 36 are welded to the side plates 13 with their legs extending in a vertical direction, and an angle member 37 is welded horizontally to plates 13 between the angles 36 to provide a three-sided enclosure for a horizontally extending removable bulkhead 38 (see FIGURES 1 and 3). The bulkhead 38 is positioned transversely across the car with each of its ends positioned on an angle 37 between two legs of angles 36. A bolt 39 is inserted through holes drilled in the legs of the angle 36 and a nut is threaded on the bolt 39, thus maintaining the bulkhead 38 in a rigid position.

Between the cross channels 16 at each end of the car, angle members 40 are welded with downwardly extending legs having holes drilled therein. A shaft 41 having eccentric camming members 42 as shown in FIGURE 7 is rotatably mounted in the holes. The cams 42 are affixed to the shafts 41 by means of set screws (not shown) thus preventing lateral movement of shafts 41. The ends of the shafts 41 are squared, as shown at 43, to permit turning of the shafts and the affixed cams 42 by means of a wrench or the like.

Shafts 41 and cams 42 are located a sufficient distance back of the front channels 16 to permit the insertion of elongated bulkheads 44 between the cams and channels 16. The lower ends of the bulkheads 44 are inserted into holes 45 in the plate 6. Below the hole 45, plates 46 are welded to the plate 6 to form a pocket which will allow the bulkhead 44 to move only a limited direction below the plate 6 in the manner shown in FIGURE 3.

Preferably, the removable bulkheads 38 and 44 are 4″ x 6″ wooden posts; however, it is within the scope of the present invention to fabricate the bulkheads from any desirable material. In using wooden bulkheads, it is preferable to affix steel plates 47 to the upper end of the vertically extending bulkheads 44 to prevent disintegration thereof due to the crushing action of the cam 42.

The rails 33 on two adjacent tie cars can be joined by inserting a removable rail to bridge the space between the cars such that the unloading machine may move from one car to the next. FIGURE 5 is a plan view of two adjacent tie cars, designated by dashed lines, with the movable rail in position between the cars. FIGURE 8 shows a side elevation view of the movable rail in position.

The stationary rails on the left-hand car are designated 33 and the similar rails on the right-hand car are designated $33^1$ in FIGURE 5. Underlying and extending beyond the ends of each of the rails 33 and $33^1$ is a shoe 48 consisting of a bottom plate 49 and side plates 50. Movable rails 51 extend longitudinally between the rails 33 and $33^1$ and fit between the sides 50 of the shoe 48. The rail 33, shown in the lower left-hand corner of FIGURE 5, and rail $33^1$, shown in the upper right-hand corner of FIGURE 5, have fingers 53 attached to each of them by nuts and bolts 54. The same rails 33 and $33^1$ are cut out at 55 to permit the attachment of the finger 53. One end of each of the movable rails 51 is cut out at 56 to permit the insertion of the finger 53 overlapping a portion of the rail 51. The other ends of the movable rails are cut out at 57 to permit the attachment of fingers 58 by nuts and bolts 59. The fingers 58 overlap the rails 33 and $33^1$ in a cut-out portion 60 of the rails. The movable rails 51 are not of a length sufficient to bridge the whole distance between the rails 33 and $33^1$ and thus leave a portion 61 open. This open portion 61 is necessary to permit the movable rail to slide a distance sufficient to allow the lower flange of the movable rail 51 to be inserted underneath the finger 53. It is also necessary that the movable rail have a degree of leeway to allow the two adjoining cars, between which the rail 51 is situated, to turn at angles relative to one another in navigating turns on curved track. This leeway is provided by cut-out portions 62 on the movable rail and cut-out portions 63 on walls 50 of the shoes 48.

*Tie Unloader*

The frame of the tie unloader consists of longitudinally extending channel members 65 and laterally extending channel members 66 welded thereto. Two intermediate longitudinally extending channels are welded to the channels 66 and extend beyond the forward edge of the frame.

The car is mounted on wheels 35 affixed to axles 67 which are rotatably mounted in pillow blocks 68 bolted to the underside of the frame.

A fuel tank 69 mounted on the left side of the frame supplies fuel to a diesel motor 70 mounted in the center of the frame. The diesel motor is preferably a G.M.C. diesel model No. 2031 which generates 65 hp. at 2000 r.p.m. The motor has a power shaft 71 extending rearwardly of the machine with sheave 72 mounted thereon. Continuous belts 73 extend around sheave 72 and sheaves 74 and 75 mounted on shafts actuating pumps 76 and 77. The pumps 76 and 77 pressurize fluid from a reservoir tank 78 and supply it to a hydraulic propulsion motor 79, a kicker chain hydraulic motor 80, and a rail clamping cylinder 81.

The hydraulic propulsion motor 79 is connected to a transmission drive 82 which drives a pair of sprockets 83. A pair of continuous chains 84 are looped around the sprockets 83 and sprockets 85 keyed to the front and rear axles 67, thus providing a motive force for the tie unloader.

The hydraulic kicker chain motor 80 is mounted on the right side of the unloader frame and is connected to the kicker chain transmission drive 86 by a coupling. The kicker chain transmission drive 86 rotates a vertical shaft 87 having a sprocket 88 keyed thereon. A continuous drive chain 89 extends around the sprocket 88 and around an upper sprocket 91 keyed to a shaft 92. The shaft 92 is mounted vertically in bearings 93 which are attached to the unloader frame by brackets 94. Another lower positioned sprocket 95 is also keyed to the shaft 92 and has a continuous kicker chain 96 looped around it and extending transversely across the front of the machine. The kicker chain 96 is looped around a sprocket 97 mounted on a vertical shaft 98 positioned in bearings 99 at the right front side of the tie unloader as viewed in FIGURE 12. The bearings 99 are rigidly mounted on a plate 100 which has integral slide shafts 101 extending therefrom. The slide shafts are movable in sleeves 102 which are welded to a plate 103 affixed to the frame channel 66 by a bracket 104. A threaded shaft 105 is fixed to plate 100 and extends parallel to and between the slide shafts 101. The shaft 105 extends through an aperture in plate 103 and has nuts 107 positioned on each side of the plate 103. Thus, by screwing the nuts 107, the plate 100 may be adjusted inwardly and outwardly to vary the tension on the kicker chain 96 which is looped around the sprocket 97. The slide shafts 101 maintain the kicker chain in proper alignment.

The kicker chain consists of a continuous triple width chain, preferably 1¼" pitch and 166 pitches, as shown in FIGURES 13 and 14. The chain is connected together transversely by a double headed rivet 109 inserted through a plurality of links 110. Kicker plates are attached to the chain by T-shaped plates 111, two of which function as outside links, through which the rivets 109 extend in the manner shown in FIGURE 14. The plates 111 are spaced across the width of the chain and the two center plates extend into slots 112 in kicker plates 113 and are secured thereto by welding. The two outside plates 111 are welded to the edges of kicker plates 113 which extend substantially perpendicular to the plane of the chain during its transverse movement in front of the machine. The kicker plates are attached to the chain two links apart as shown in FIGURE 13. Welded to the outwardly extending ends of the kicker plates are kicker head plates 114 which extend in a plane parallel to the plane of the chain during its transverse movement in front of the machine. The kicker head plates 114 of the two spaced kicker plates are in unconnected spaced relationship at the plane 115. A backing bar 116 is attached to the chain at a point intermediate the plates 113 in the same manner as described above by use of a T-plate 111. A backing head plate 117 is welded to the outwardly extending end of the plate 116 and extends parallel to the plane of the chain during its transverse movement in front of the machine. The plate 117 is spaced from the plates 113 at the planes 118. The backing head plate 117 is of substantially the same width parallel to the chain as that portion of plate 113 shown in FIGURE 14 which is farthest removed from the chain. The portions of plates 113 and 116 nearest the chain are of greater width to span the triple width chain.

During movement of the kicker plates and backing bar around the sprockets 95 or 97, the plates 114 spread apart at plane 115 and plate 117 moves away from plates 113 in the planes 118 in the manner shown in FIGURE 9.

Vertically extending channels 119 are welded to the front edge of frame channels 65 which extend beyond the forward edge of the frame as shown in FIGURE 9. The channels 119 are maintained in spaced relationship by a cross brace 120. The front edge of the channels 119 contact a stack of ties and properly position them for contact by the kicker chain 96 in the manner shown in FIGURES 4 and 10.

Attached to the outward sides of the channels 119 are sanding devices 121 which feed sand through valves 122 and pipes 123 into the proximity of the front wheels of the tie unloader. The valves 122 are operated manually by means of a handle 123a. Ties are normally coated with creosote which will drip upon the rails along which the wheels of the tie unloader operate, thus making the rails slippery. Thus, the deposition of sand upon the rails is necessary to insure a firm traction of the wheels thereon.

Two tie hold-down mechanisms 124 are mounted in spaced positions on the front of the frame by plates 125 which are welded to channels 66 and 119. The side frames of the tie hold-down mechanisms, shown in FIGURES 9 to 12 and 18, consist of two side plates 126 having enclosed slots 127. The plates 126 are welded to mounting plates 125 at their lower edges and are maintained in spaced relationship at their upper edges by cross plates 128. An I-shaped slide, consisting of upper and lower flanges 130 and a web portion 131, is movably mounted on rollers 132 rotatable on axles 133 which extend through circular openings 134 in the web portion 131. Additional supporting plates 135 having holes to receive the axles 133 are welded on each side of the openings 134. The rollers 132 are movable in the slots 127 in the upper portion of side plates 126. A spring 134a is connected to the lower flange 130 of the slide and at the lower end to the plate 125. The spring is positioned at an angle to normally urge the slide to its forward position.

A downwardly extending bent plate 136 is welded to the front of the slide and has a wheel 137 rotatively mounted on the lower end thereof. Suitable lubrication means is provided for the wheel 137. A triangular plate 138 is welded to the front side of the bent plate 136 to provide a surface against which a stack of ties can exert a force to move the slide to retracted position.

The slides of the tie hold-down mechanisms are in retracted positions and the springs 134a are in the tensioned state when a stack of ties are abutting against the channel 119. The slides move forward to the position shown in FIGURES 10 and 11 when there is only one tie remaining in the stack, the other ties in the stack having been discharged through the wall openings in the tie car. When the slides move forward, the roller 137 engages the upper surface of the remaining tie to maintain it in a horizontal plane while being unloaded transversely of the tie car.

A plate 139 is positioned horizontally across the front of the machine and rigidly affixed to the frame by channels 140. The plate 139 has a plurality of rectangular openings 141 spaced along its length. Each opening has a roller 142 mounted therein for rotation on an axle 143 welded to the underside of the plate 139. The plate 139 with its accompanying rollers 142 is freely insertable under a stack of ties in the manner shown in FIGURES 4 and 10 since the plate is at a lower level than the upper surface of rails 32 which support the ties. During discharge of the ties in a transverse direction of the machine, the kicker plate on chain 96 will engage an end of the tie being discharged and move the tie transversely until one end falls off the top surface of the rail 32 and upon the rollers 142. Thus, rollers 142 and the plate 139 maintain the tie horizontal during its transverse movement from the car.

Mounted on the rear of the tie unloader is a rail clamp 144 shown in FIGURES 15, 16, and 17. The rail clamp is rigidly affixed to the tie unloader by plates 145 at each end of the clamp being welded to channel 66 of the frame.

Each plate 145 has a hole in its lower end which receives a pin 146 to pivotally mount a pair of long rail clamp arms 147 at about their mid points and a pair of short rail clamp arms 148 at their upper ends. The upper ends of long rail clamp arms 147 are pivotally connected to a pair of links 149 and a similar pair of links 150 are pivotally connected to an intermediate point on short rail clamping arms 148 by means of a pin 151. The inner ends of the links 149 and 150 are pivotally mounted with respect to each other and to a piston rod 152 which extends into the hydraulic rail clamping cylinder 81. The inner end of the cylinder 81 is welded to a rod 153 which extends into and is welded rigid with a slide tube 154. A slide rod 155 is reciprocable within the slide tube 154 and extends therefrom in a direction opposed to that of rod 153. The reciprocating motion of the slide rod 155 is limited by a pin 156 which extends out from and is integral with the slide rod and reciprocates in a slot 157 in the slide tube 154. The end of the slide rod 155 which extends from the slide tube is welded to a plate 158 of greater diameter than the rod. The plate 158 is welded to a bracket 159 having a hole which receives a pin 160 to pivotally mount the inner ends of links 149 and 150. A spring 161 is positioned around the slide rod 155 with one of its ends abutting the plate 158 and the other end abutting the slide tube.

In moving the rail clamp arms 147 and 148 from the open position shown in FIGURE 17 to the closed position shown in FIGURE 15, pressurized fluid is introduced into the cylinder 81, thus causing the piston rod 152 to move to the right and rod 153 and tube 154 to move to the left. The movement of the rod 152 to the right causes a scissor-like action which closes the right rail clamp arms 147 and 148 onto the right rail in the manner shown in FIGURE 15. The movemtnt of the rod 153 and slide tube 154 to the left permits the slide rod 155 to move into the slide tube 154 until its inner end abuts the inner end of rod 153 positioned within the slide tube. The rod 153 then moves further to the left and exerts a pushing force against slide rod 155 which in turn causes a scissor-like closing action between rail clamp arms 147 and 148 in the manner shown in FIGURE 15.

To open the rail clamp arms 147 and 148, the flow of pressurized fluid to cylinder 81 is reversed to move rod 152 to the left in FIGURE 15 into the cylinder. The scissor-like action on the right rail clamp due to rod 152 moving left will open the right arms 147 and 148 to release the right rail. The cylinder 81 moves to the right due to the reversal of fluid pressure, thus also moving rod 153 and slide tube 154 to the right. The spring 161, by exerting a force between plate 158 and the slide tube, urges the slide rod 155 to the left until pin 156 is in an extreme left position in slot 157. Thereafter, further movement of cylinder 81 to the right exerts a pulling force on pin 156 and rod 155 to cause a scissor-like action in the left rail clamp to open left rail clamp arms 147 and 148 to release the left rail.

A seat 162 is pivotally mounted on the rear of the machine to allow an operator sitting thereon to be within easy reach of a control desk having valves and control handles to be described hereinafter for operation of the tie unloader.

*Power system*

FIGURE 19 is a schematic diagram of the power system for the tie unloader. Unpressurized fluid moves from the oil reservoir 78 through line 164 and strainer 165 and divides into two lines 166 and 167 to supply fluid to hydraulic pumps 76 and 77 which are driven by motor 70. Fluid is pressurized in pump 76 and moves through line 166 to a multiple unit valve 163. The multiple unit valve has a built-in relief valve and contains two manually operable valve units—one for controlling the hydraulic propulsion motor 79 and a second for controlling the rail clamping cylinder 81. To actuate the hydraulic propulsion motor, a valve 168 is moved to a first position to admit pressurized fluid from line 166 to line 169 and to the hydraulic propulsion motor 79. The fluid is returned from the motor through a return line 170 and through the multiple valve unit 163 to a reservoir return line 171 which directs the fluid back to the oil reservoir 78. To operate the hydraulic propulsion motor in a reverse direction from that achieved above, the valve 168 is moved to a second position which admits the pressurized fluid from line 166 through line 170 to the motor 79 and line 169 functions as a return line.

To actuate the rail clamping cylinder 81, a valve 172 is actuated to a first position to admit pressurized fluid to a line 173 from line 166. This causes the piston rod 152 to move outwardly from the cylinder 81 to an extended position, thus moving the rail clamp arms 147 and 148 to the position shown in FIGURE 15. Line 174 is a return line from the unpressurized side of cylinder 81. To retract the piston rod 152 of the rail clamping cylinder 81, the valve 172 is moved to a second position which admits pressurized fluid from line 166 into line 174, thus retracting the piston rod into the cylinder 81 and causing the rail clamp arms 147 and 148 to move to the positions shown in FIGURE 17. Line 173 functions as the return line from the cylinder. Fluid which is returned from the rail clamping cylinder passes through the multiple unit valve 163 and to the oil reservoir 78 through line 171.

Both valves 168 and 172 have a third neutral position which does not actuate the motor or cylinder in either direction but rather allows the pressurized fluid from line 166 to pass through the multiple unit valve 163 and a check valve 175 in line 176 into a delivery line 177.

The pump 77 pressurizes fluid from line 167, passing it through a relief valve 178, through a check valve 179 and to line 177. A four-way valve 180 connected in line 177 controls the hydraulic kicker chain motor 80. To operate the hydraulic kicker chain motor in one direction, the valve 180 is manually moved to a first position which admits pressurized fluid from line 177 to line 181 which supplies the fluid to motor 80 and the fluid is returned to valve 180 through line 182. To actuate the hydraulic kicker chain motor in an opposite direction from that above, the valve 180 is moved to a second position which allows pressurized fluid from line 177 to flow through line 182, thus to the motor 80, and return through line 181 to the valve 180. Valve 180 has a third neutral position which allows the pressurized fluid from line 177 to flow through the valve and line 183 back to the reservoir 78. The fluid returning to valve 180 after actuating motor 80 is also returned to reservoir 78 through line 183.

The hydraulic propulsion motor 79 and the rail clamping cylinder 81 are only actuated by pressurized fluid generated by one pump 76; however, if neither valve 168 or valve 172 are actuated to deliver fluid to motor 79 or clamping cylinder 81, then the fluid will flow through line 176 to line 177 and into the four-way valve 180. Thus, the valve 180 has the output of both pumps 76 and 77 available for actuating the hydraulic kicker chain motor.

*Operation*

The tie car is loaded with ties in any conventional manner, for example, by use of a mechanical boom. It is necessary that the ties maintain a substantially transverse position within the tie car to permit proper unloading by the tie unloader.

Prior to the loading of the tie car, the doors 24 are swung to the lowered position as shown in the left-hand portion of FIGURE 3 and locked there by pin 28 being inserted through holes 27 and into the door pin holders 26. It is also necessary that the bulkheads be positioned in each end of the car to maintain the load of ties in proper position. At each end of the car, the bulkheads 38 are inserted between the legs of the angles 36 and come to rest against the legs of the angles 37. The bulkhead 38 is in a transverse position as shown in FIGURE 3. A bolt 39 is inserted through holes in the legs of the angles 36 and a nut is tightened thereon to maintain the movable bulkhead 38 in rigid position. The movable bulkheads 44 are then inserted vertically between the cam surface 42 and the cross channels 16 with their lower ends in holes 45 in the plate 6 and abutting against the plate 46. At this time, the bulkheads 44 will have the position illustrated in FIGURES 3 and 8. The shaft 41 is then rotated to move the cam 42 from the position shown in the right-hand portion of FIGURE 8 to the position shown in the left-hand portion of FIGURE 8, thus locking the bulkheads 44 rigidly in position.

The carload of ties is then conveyed to the general area where it is desired to unload some or all of the ties.

To unload the ties:

The cams 42 are rotated to release the bulkheads 44 at one end of the car and the bulkheads 44 are removed. Then, at the same end of the car, nuts and bolts 39 are removed and removable bulkhead 38 is disengaged from the angles 36 and 37 and removed from the car.

The pins 28 are pulled upwardly to release the doors 24 from the vertical position. The pins are inserted into wall pin holders 30 to place them out of the way. The doors 24 are swung to the horizontal position, as shown in the right-hand portion of FIGURE 3, and maintained there by chains and hooks 31. An unloading machine is then positioned on the rails 33 at the end of the car where the bulkheads have been removed and it proceeds to throw the ties 64 transversely out the opening 23 in the side of the car in the manner shown in FIGURE 4.

The tie unloader is moved forward on rails 33 by the operator sitting on seat 162 actuating the manual valve 168 to deliver pressurized fluid from the pump 76 to the hydraulic propulsion motor 79. The forward motion of the tie unloader is stopped when the channels 119 engage a stack of ties.

The operator then actuates manual valve 172 to move the piston rod 152 of the rail clamping cylinder 81 to an extended position, thus moving the rail clamp arms 147 and 148 into contact with the rails 33 and securing the tie unloader in a rigid position.

The four-way valve 180 is then actuated by the operator to move the kicker chain 96 until the kicker head plate 114 engages the bottom tie in the stack and moves it transversely of the machine and tie car through one of the openings 23. The tie is maintained in a horizontal position during its discharge by the angles 19 and 20 on the tie car and the plate 139 on the tie unloader. When all but the last tie in the stack has been unloaded, the slide of the tie hold-down 124 moves forward until wheel 137 engages with the upper surface of the last tie. Thus, the last tie during its transverse movement through the opening 23 is prevented from tilting downward on the outside of the tie car after its center of gravity has passed outward beyond the angle 19 on the side wall of the tie car.

After the entire stack of ties has been discharged through the opening in the tie car, the rail clamp is released by actuating the piston rod 152 inwardly into the cylinder 81, thus moving the rail clamp arms 147 and 148 out of engagement with the rails. The tie unloader is then moved forward into engagement with the next stack of ties and the procedure is repeated until the tie car is unloaded.

The speed of travel of the kicker chain, and thus the thrust exerted on the ties, may be varied by proper manipulation of the valve 180 so that the discharged ties may be thrown a lesser or greater distance from the tie car to insure convenient positioning for subsequent use.

After all the ties have been removed from one car, it is necessary that the unloading machine be moved forward to the next loaded tie car. To accomplish this, the bulkheads 38 and 44 are removed in the manner described above from the other end of the car which has just been unloaded to permit the unloading machine 34 to pass. The movable track 51 is then inserted to bridge the space between the two cars by sliding the lower flange of the movable rail under the finger 53 attached to rail 33 until the rail 51 moves downwardly into position between the sides 50 of the shoe 48. At this point, the finger 58 will overlap a portion of the rail $33^1$. The same procedure is followed to insert the second movable rail to join the other rails 33 and $33^1$ except that the lower flange of the movable rail 51 is inserted under the finger 53 attached to the rail $33^1$.

The bulkheads 38 and 44 in the forward loaded car are then removed from one end of the car in the same manner as described above by unlocking the cam 42 and removing the nuts and bolts 39. After the bulkheads have been removed, the unloading machine 34 moves forward over the movable track between the cars and unloads the ties 64 from the forward car. This procedure is repeated until all the cars have been unloaded.

The tie car may be moving continuously during the unloading procedure with a second man outside the car to indicate to the operator of the unloading machine when a tie should be unloaded.

It may be seen from the above description that the present invention involves a novel tie car and unloader which requires a minimum of manual labor to operate. Each of the tie cars is of large capacity and normally holds about 400 ties. Each car can be unloaded in about 45 minutes. The ties are loaded into the tie car in any known manner and no special handling such as metal bonds or the like are necessary to maintain the ties in proper position. The design of the opening in the side walls of the car assists in maintaining the tie in a horizontal position until it is clear of the car. This, plus the fact that the ties are unloaded at floor level instead of over the side of a gondola car and, therefore, have a shorter distance to fall, makes it possible to control the placing of the ties more accurately.

While we have described a present preferred embodiment of our invention, it is to be understood that it may be otherwise embodied within the scope of the following claims.

We claim:

1. A tie unloader for unloading ties from a car in which they are positioned in a plurality of stacks one above the other, the ties extending transversely of the car and the stacks being adjacent each other along the length of the car, said unloader comprising,
    (A) a frame having a side extending generally parallel to the stacked ties,
    (B) a chain on said side having
        (1) a path of travel parallel to the ties and
        (2) a finger extending out from the chain to engage a tie,
        (3) said chain being at a level with the lowermost tie of a stack adjacent the frame whereby on movement of the chain the finger will engage the end of the lowermost tie and move it transversely of the car increasing its speed of movement as it leaves the car so that it is thrown from the car in a substantially horizontal plane, and
    (C) means for moving the frame towards and against the stacks of ties.

2. A tie unloader as described in claim 1 and having a support extending beneath the path of the finger on the chain and engaging the bottom surface of the lowermost tie in a stack to maintain it in horizontal position as it is moved transversely of the car.

3. A tie unloader as described in claim 1 and having a hold-down mechanism mounted on the frame above the path of the finger on the chain to hold down the last tie of a stack as it is moved transversely of the car.

4. Tie unloading apparatus comprising
    (A) a railway car having
        (1) a floor, (2) sides extending the length of the car (3) rails extending the length of the car upon which ties may be stacked transversely of the car and one above the other, and (4) openings in the sides opposite the lowermost ties in stacks of ties in the car, and (B) an unloading machine in the car having (1) means to move the machine along the car to bring it adjacent successive stacks of ties, and (2) means to engage the lowermost tie in each stack and move it transversely of the car out one of said openings.

5. Tie unloading apparatus as described in claim 4 in which the rails support the ties above the floor of the car and in which the unloading machine has a support which extends beneath the lowermost tie of each stack of ties when it is moved transversely of the car.

6. A tie unloader kicker chain comprising, (A) a continuous chain, (B) plates affixed to the chain separated from each other along the chain and extending perpendicular to the chain, (C) head plates affixed to the outermost edges of the plates and extending parallel to the chain, (D) a backing bar affixed to and extending perpendicular to the chain but of lesser height than said plates, and (E) a head bar affixed to the outermost edges of the backing bars and extending parallel to the chain between said plates.

References Cited in the file of this patent

UNITED STATES PATENTS

| | | |
|---|---|---|
| 1,019,395 | White | Mar. 5, 1912 |
| 1,259,426 | Meindel | Mar. 12, 1918 |
| 1,444,207 | Penfield | Feb. 6, 1923 |
| 1,531,075 | Clubine | Mar. 24, 1925 |
| 1,918,419 | Needham | July 18, 1933 |
| 2,369,784 | Johnson | Feb. 20, 1945 |
| 2,546,951 | Petrilli | Mar. 27, 1951 |
| 2,591,556 | Knutson | Apr. 1, 1952 |
| 2,709,532 | Marietta | May 31, 1955 |
| 2,786,426 | Brosnan | Mar. 26, 1957 |
| 2,801,014 | Colson | July 30, 1957 |